United States Patent
Matsuda et al.

(10) Patent No.: US 6,513,253 B2
(45) Date of Patent: Feb. 4, 2003

(54) METHOD FOR EVALUATING MEASUREMENT ERROR IN COORDINATE MEASURING MACHINE AND GAUGE FOR COORDINATE MEASURING MACHINE

(75) Inventors: Jiro Matsuda, 89-55, Edo, Minori-cho, Higashiibaraki-gun, Ibaraki-ken 319-0122 (JP); Susumu Asanuma, Hamamatsu (JP); Masanori Shibata, Hamamatsu (JP)

(73) Assignees: Jiro Matsuda, Ibaraki-ken (JP); National Institute of Advanced Industrial Science and Technology, Ministry of Economy, Trade and Industry (AIST), Tokyo (JP); Asanuma Giken Co. Ltd., Shizoka-ken (JP)

( * ) Notice: Subject to any disclaimer, the term of this patent is extended or adjusted under 35 U.S.C. 154(b) by 10 days.

(21) Appl. No.: 09/777,956

(22) Filed: Feb. 7, 2001

(65) Prior Publication Data
US 2001/0045021 A1 Nov. 29, 2001

(51) Int. Cl.[7] .............................................. G01C 25/00
(52) U.S. Cl. ......................................... 33/502; 73/1.79
(58) Field of Search ......................... 33/502, 503, 567, 33/567.1; 73/1.01, 1.79

(56) References Cited

U.S. PATENT DOCUMENTS

| | | | |
|---|---|---|---|
| 4,437,151 A | * 3/1984 | Hurt et al. | 364/571 |
| 4,523,450 A | 6/1985 | Herzog | |
| 4,583,298 A | * 4/1986 | Raugh | 33/502 |
| 4,819,339 A | 4/1989 | Kunzmann et al. | |
| 4,962,591 A | 10/1990 | Zeller et al. | |
| 5,125,261 A | * 6/1992 | Powley | 73/1 J |
| 5,313,410 A | * 5/1994 | Watts | 364/571.01 |
| 5,583,443 A | * 12/1996 | McMurty et al. | 324/601 |
| 6,067,165 A | 5/2000 | Matsumiya et al. | |
| 6,112,423 A | 9/2000 | Sheehan | |

FOREIGN PATENT DOCUMENTS

DE          296 18 726          3/1997

* cited by examiner

Primary Examiner—Diego Gutierrez
Assistant Examiner—Tania C. Courson
(74) Attorney, Agent, or Firm—Browdy and Neimark, P.L.L.C.

(57) ABSTRACT

A gauge for a coordinate measuring machine has a plurality of balls whose centers are located on at least one line inclined with respect to a reference axis in a virtual reference plane. The gauge is set on a measuring table of the coordinate measuring machine. Orthogonal coordinates in which one of the coordinate axes is identical to the reference axis are set in the virtual reference plane. The coordinates of the center of each ball are measured by the coordinate measuring machine. Thereafter, the gauge is turned and inverted by 180 degrees about the reference axis and is set again on the measuring table. Orthogonal coordinates in which one of the coordinate axes is identical to the reference axis are set in the virtual reference plane. The coordinates of the center of each ball are measured in the same way as above. Thus, measurement errors of the straightness of the machine axes of the coordinate measuring machine and the orthogonality between the machine axes can be easily and precisely evaluated.

6 Claims, 11 Drawing Sheets

METHOD FOR EVALUATING MEASUREMENT ERROR IN COORDINATE MEASURING MACHINE AND GAUGE FOR COORDINATE MEASURING MACHINE

BACKGROUND OF THE INVENTION

1. Field of the Invention

The present invention relates to a method for measuring and evaluating a variety of inherent measurement errors of a coordinate measuring machine which is used to measure, for example, dimensions of mechanical parts, etc., and to a gauge for a coordinate measuring machine, which is adapted to measure an error of a coordinate measuring machine.

2. Description of the Related Art

In a known coordinate measuring machine having a movable probe capable of moving in three mutually orthogonal directions, the tip of the movable probe is brought into contact with an object to be measured that is set on a measuring table in order to measure dimensions of the object. The object may be, for example, a mechanical part such as a casing for an engine or for a transmission gear box.

In general, in such a coordinate measuring machine, the probe is movable in three mutually orthogonal directions. For example, Japanese Unexamined Patent Publication No. H02-306101 discloses a coordinate measuring machine in which a first gantry type movable member is linearly movable along horizontal guide rails which extend on opposite sides of a measuring table on which an object to be measure is set in place. The first movable member is provided with a second movable member mounted thereon so as to move in a horizontal direction perpendicular to the direction of the movement of the first movable member.

The second movable member is provided with a vertically movable spindle portion whose front end has a probe with a ball secured thereto. The probe is moved in the three-dimensional directions while bringing the ball into contact with the upper surface of the object to be measured, which is set on the measuring table, to measure the dimensions of each part of the object.

In the coordinate measuring machine as discussed above, if the ball of the probe is worn, correct measurement can no longer be expected. To prevent this, a reference gauge is set on the measuring table at the interval of the measurement, so that the dimension of each part of the reference gauge is measured to correct an error due to the wearing of the ball of the probe.

The measurement errors of the coordinate measuring machine include those caused by a winding movement of the probe tip which is in turn caused by a deflection or distortion of a guide member, such as the guide rails along which the probe tip is moved or angular deviations from a right angle of two guide members for guiding the movement of the probe in two mutually orthogonal directions, etc.

In the prior art, the straightness of the guide members of the coordinate measuring machine or the orthogonality of the guide members is established by reference gauges which are set in different directions on the measuring table. Therefore, the measuring operation for evaluation of the errors of the coordinate measuring machine requires time and labor.

In recent years, on the one hand, the operating efficiency of the coordinate measuring machine has been increased in companies or factories to determine the dimensions of precisely and complicatedly machined workpieces, and on the other hand, the coordinate measuring machines tend to be continuously used without periodically checking the performance thereof, from the economic viewpoint or in the view of practical use.

BRIEF SUMMARY OF THE INVENTION

It is an object of the present invention to eliminate the above-mentioned drawbacks of the prior art by providing a method for evaluating a measurement error in which an error evaluation in connection with the straightness of the machine axes in a coordinate measuring machine or the orthogonality of the machine axes can be easily and precisely carried out.

Another object of the present invention is to provide a gauge for a coordinate measuring machine, for use with the measurement error evaluating method.

A measurement error evaluating method for a coordinate measuring machine according to the present invention is applied to an error evaluation of a coordinate measuring machine in which a probe tip is moved relative to an object to be measured along three different mutually orthogonal axes.

According to one aspect of the present invention, there is provided a method for evaluating a measurement error of a coordinate measuring machine, in which a tip of a probe is moved relative to an object to be measured, along three orthogonal machine axes, comprising;

a first step of setting on a measuring table of a coordinate measuring machine a gauge for the coordinate measuring machine having a plurality of balls whose centers are aligned on a straight line inclined with respect to a reference axis set in a virtual reference plane and extending in the virtual reference plane so that the reference axis is in parallel with one of the three machine axes of the coordinate measuring machine and so that the virtual reference plane is in parallel with either one of the remaining two machine axes of the coordinate measuring machine;

a second step of setting orthogonal coordinates in which one of the coordinate axes is identical to the direction of the reference axis in the virtual reference plane, so that the center position of each ball with respect to the coordinates is measured by the coordinate measuring machine;

a third step of turning and inverting the gauge for the coordinate measuring machine about the reference axis by 180 degrees and again setting the gauge on the measuring table of the coordinate measuring machine; and a fourth step of setting orthogonal coordinates in which one of the coordinate axes is identical to the direction of the reference axis in the virtual reference plane, so that the center position of each ball with respect to the coordinates is measured by the coordinate measuring machine.

The straightness of the machine axis in the reference axis direction can be evaluated, based on coordinates $Y_i$ of the center of the i-th ball in a direction perpendicular to the reference axis of the gauge for a coordinate measuring machine, obtained in the second step, and coordinates $Y'_i$ of the center of the i-th ball in a direction perpendicular to the reference axis of the gauge for a coordinate measuring machine, obtained in the fourth step, by calculating the difference between the maximum value and the minimum value of $(Y_i - Y'_i)/2$.

Also, in an embodiment, a regression line is obtained from the coordinates of the centers of the balls in the reference axis direction of the gauge and the direction perpendicular to the reference axis, obtained in the second step, to thereby calculate an angle θ between the reference axis and the regression line, and thereafter a regression line is obtained from the coordinates of the centers of the balls in the reference axis direction of the gauge and the direction perpendicular to the reference axis, obtained in the fourth step, to thereby calculate an angle θ' between the reference axis and the regression line, so that the orthogonality of the two machine axes parallel with the virtual reference plane is evaluated using (θ−θ')/2.

According to another aspect of the invention, there is provided a gauge for a coordinate measuring machine comprising;

a plurality of balls with which a tip of a probe of a coordinate measuring machine is brought into contact, and a holder which holds the balls arranged along a line inclined with respect to a reference axis set in an virtual reference plane and extending in the virtual reference plane, said holder being capable of attachment to the coordinate measuring machine so that the virtual reference plane is parallel with two optional machine axes of the coordinate measuring machine and that the reference axis is parallel with one of the two machine axes.

Preferably, the holder is made of a trapezoidal block, so that the balls are arrayed and mounted along each oblique line parallel with the non-parallel oblique surfaces of the trapezoidal block.

Preferably, the holder is made of a block having a trapezoidal through hole, so that the balls are arrayed and mounted along each line parallel with opposite non-parallel oblique surfaces of the through hole.

BRIEF DESCRIPTION OF THE DRAWINGS

The invention will be described below in greater detail with reference to the accompanying drawings, in which.

DETAILED DESCRIPTION OF THE INVENTION

The present invention is adapted to estimate measurement errors of a coordinate measuring machine to measure dimensions of each part of an object to be measured set on a measuring table by moving a probe tip in three orthogonal axis directions while bringing the same into contact with the object.

An error estimate of a coordinate measuring machine includes an error estimate of a measurement value obtained by measuring a distance between two spaced points, with respect to a pure value, an estimate of a measurement value of the straightness of the machine axes obtained by moving the probe along the machine axes, and an estimate of the orthogonality of two axes.

For the error estimates mentioned above there is used a gauge for a coordinate measuring machine, the gauge having a plurality of balls whose centers are located on and along an oblique line which extends in a virtual reference plane, in an oblique direction with respect to a reference axis and whose centers are aligned on at least two straight lines that form an angle different from 90° with one another. The balls are adapted to come into contact with probe tips in the course of the error measurement of the coordinate measuring machine. The balls whose surfaces are finished to exhibit a highly precise spherical surface of a predetermined diameter are each made of a hard material having a low thermal coefficient, such as a ceramic.

The balls are secured to a holder which is mounted to the measuring table of the coordinate measuring machine through a mounting fixture or jig. The holder can be made of a high rigidity material having a low thermal coefficient, such as granite or non-shrinking steel, etc.

In the coordinate measuring machine, the holder can be made of a substantially flat trapezoidal block. The balls are secured to one or both of the oblique, or non-parallel, surfaces of the block (holder), so that a straight line or lines connecting the centers of the balls extend(s) in parallel with the oblique surface(s).

It is preferable that the line normal to the virtual reference plane including the straight line(s) extend in the direction of the thickness of the trapezoidal block and that the reference axis be normal to the parallel side surfaces (base and top side surfaces) of the trapezoidal block.

If the holder is made of an isosceles trapezoidal block which is provided on both the non-parallel side surfaces (oblique surfaces) thereof with the balls, it is preferable that the two straight lines connecting the centers of the balls be included in one virtual reference plane and be arranged symmetrically with respect to the reference axis included in the virtual reference plane.

Alternatively, it is possible to make the holder of a substantially flat block having a trapezoidal through hole, in which the balls are aligned and secured to one or both of the opposed oblique, or non-parallel, side surfaces of the trapezoidal through hole, so that the straight line(s) connecting the centers of the balls extend in parallel with the corresponding oblique surface(s).

In this latter alternative, preferably, the line normal to the virtual reference plane that includes the straight line(s) extends in the direction of the thickness of the holder in the form of a block and the reference axis is normal to the base and top parallel sides of the trapezoidal through hole.

Moreover, if the through hole is in the form of an isosceles trapezoid and the balls are arranged on both of the non-parallel side surfaces (oblique surfaces) of the isosceles trapezoidal through hole, it is preferable that the two straight lines connecting the centers of the balls on the oblique surfaces be included in one virtual reference plane and that the two straight lines be arranged in symmetry with respect to the reference axis included in the virtual reference plane.

To measure an error of the coordinate measuring machine using the gauge for a coordinate measuring machine according to the present invention, the gauge is set on the measuring table of the coordinate measuring machine, wherein the holder is oriented so that the reference axis extends in parallel with one of the machine axes and the virtual reference plane is in parallel with one of the remaining two machine axes.

Thereafter, the position of the center of each ball of the gauge for the coordinate measuring machine is measured, based on orthogonal coordinates (which will be referred to as gauge coordinates) having the reference axis direction set on the virtual reference plane and the two mutually orthogonal directions perpendicular to the reference axis direction.

The virtual reference plane can be defined in accordance with at least three spaced points on the gauge. If the gauge is made of a trapezoidal block and the balls are arranged on both of the oblique surfaces (non-parallel surfaces) of the trapezoid, the virtual reference plane is defined by measuring the center positions of the end balls of each ball array on each oblique surface, so that the gauge coordinates can be set on the virtual reference plane.

If the gauge coordinates are set, it is possible to correspond, one by one, the gauge coordinates to orthogonal coordinates (which will be referred to as machine coordinates) whose coordinate axes correspond to the machine axes of the coordinate measuring machine.

Note that the center position of each ball is determined by measuring five spaced points on the spherical surface. This determination is carried out while confirming the sphericity of the balls based on the predetermined pure diameter value of the balls.

For instance, to measure the center of each ball, the positions of five points, including four points on the equator of each ball and the point at one of the poles are measured twice, using the probe for a coordinate measuring machine and are compared with the predetermined pure diameter value of the ball to confirm the sphericity of the spherical ball.

The measurement of the center positions of the balls can be carried out in such a way that the first ball to the last ball in the ball array are first successively measured and when the measurement of the last ball ends, the last ball to the first ball are successively measured in the opposite order. This stabilizes the measuring operation.

When the center positions of all the balls are measured for the gauge coordinates, the gauge is turned and inverted about the reference axis by 180 degrees, and is thereafter set again on the measuring table of the coordinate measuring machine to determine again the gauge coordinates. Thereafter, for the 180 degree-inverted position, the center positions of the balls for the gauge coordinates are measured in the same way as that mentioned above.

Thereafter, based on the measurements of the center positions of the balls thus obtained, the distances between the center of a specific ball and the centers of the remaining balls are calculated and are compared with a predetermined pure value to evaluate an error.

The error evaluation is effected by averaging the measurements obtained when the gauge for a coordinate measuring machine is set with the front side thereof facing upward and when it is turned by 180 degrees about the reference axis and set on the coordinate measuring machine.

It is possible to estimate the straightness of the machine axis extending in the direction of the reference axis, as a deflection between the maximum value and the minimum value of $(Y_i - Y'_i)/2$, wherein $Y_i$ represents the coordinates of the center of the i-th ball in the direction perpendicular to the reference axis, obtained when the gauge for a coordinate measuring machine is set with the front side facing upward and $Y'_i$ represents the coordinates of the center of the i-th ball in the direction perpendicular to the reference axis, obtained when the gauge for the coordinate measuring machine has been turned by 180 degrees about the reference axis and is set on the measuring table of the coordinate measuring machine, respectively.

A regression line is obtained using the method of least squares, based on the coordinates $X_i$ of the center of the i-th ball in the reference axis direction and the coordinates $Y_i$ thereof in the direction perpendicular to the reference axis when the gauge for a coordinate measuring machine is set with the front side facing upward to thereby calculate the angle $\theta$ defined between the regression line and the reference axis.

Thereafter, a regression line is obtained using the method of least squares, based on the coordinates $X'_i$ of the center of the i-th ball in the reference axis direction and the coordinates $Y'_i$ thereof in the direction perpendicular to the reference axis when the gauge for a coordinate measuring machine has been turned by 180 degrees about the reference axis and set on the measuring table to thereby calculate the angle $\theta'$ defined between the regression line and the reference axis. Thus, the orthogonality of the two machine axes parallel with the virtual reference plane can be evaluated based on the value of $(\theta - \theta')/2$.

Thus, it is possible to evaluate the straightness of any machine axis and the orthogonality between two machine axes by changing the set angle of the gauge for the coordinate measuring machine with respect to the measuring table of the coordinate measuring machine so that the reference axis is parallel with one of the machine axes of the coordinate measuring machine and the virtual reference plane is parallel with any of the remaining two machine axes.

Figure 1:
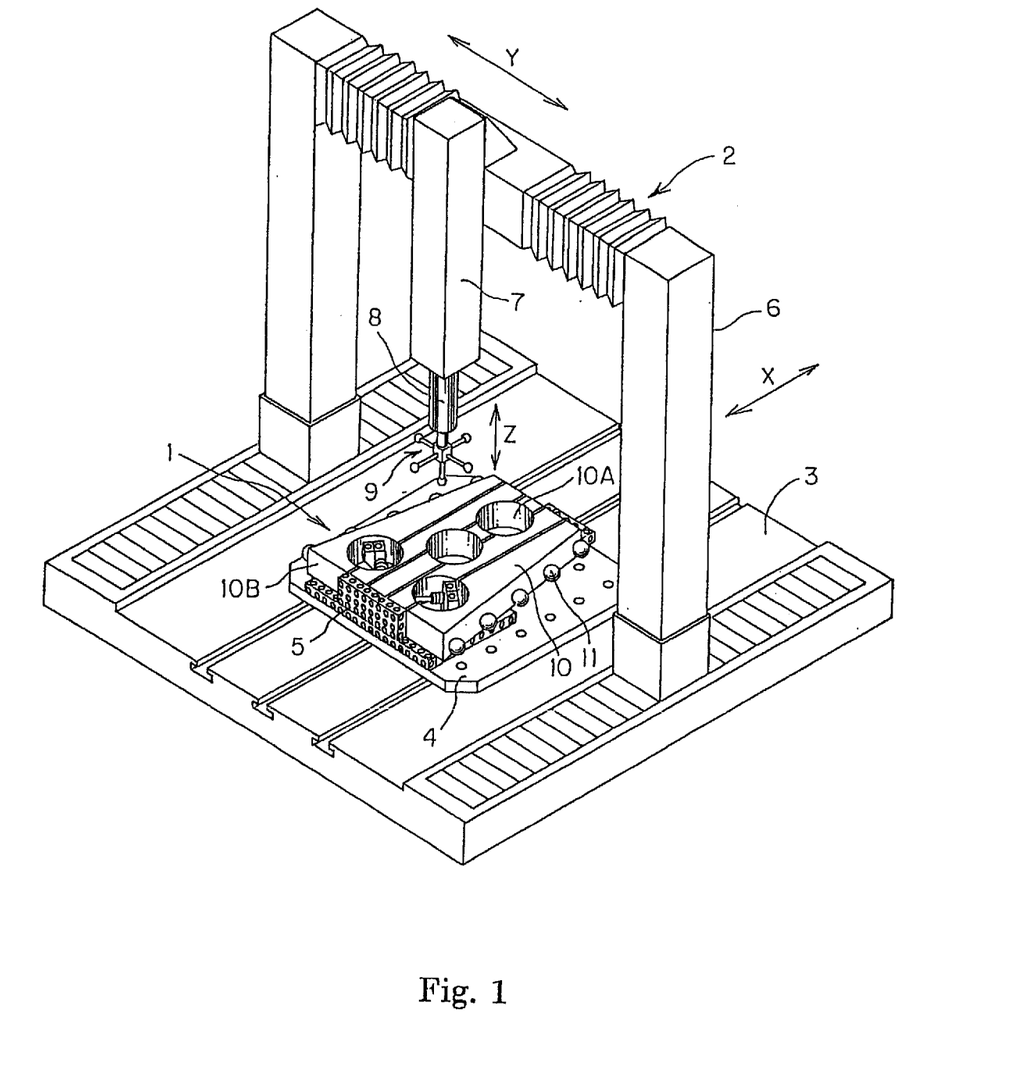
FIG. 1 is a perspective view of a gauge for a coordinate measuring machine, mounted to a coordinate measuring machine, according to the present invention.

Here, looking at the drawings, FIG. 1 shows a gauge for a coordinate measuring machine, the gauge being set on the coordinate measuring machine to evaluate an error thereof, according to the present invention. As can be seen in FIG. 1, the gauge 1 for the coordinate measuring machine is secured by a mounting jig (mounting fixture) 5 to a jig pallet 4 set on a measuring table 3 of a coordinate measuring machine 2.

The coordinate measuring machine 2 is comprised of a gantry type movable frame 6 which is supported on opposite sides of the measuring table 3 so as to slide in the direction X, a head portion 7 which is supported by the movable frame 6 to slide in the direction Y perpendicular to the direction X, and an elevating/descending shaft 8 which is supported by the head portion 7 to move in the upward and downward direction, i.e. in the direction Z, perpendicular to the directions X and Y, so that a probe 9 secured to the lower end of the elevating shaft 8 can be moved and positioned in the three-dimensional, or mutually orthogonal, directions relative to the measuring table 3.

The movable frame 6, the head portion 7, and the elevating shaft 8 are moved in the directions of the machine axes of the coordinate measuring machine 2. The coordinates having the axes X, Y and Z are referred to as the machine coordinates, or the machine coordinate system.

Figure 2:
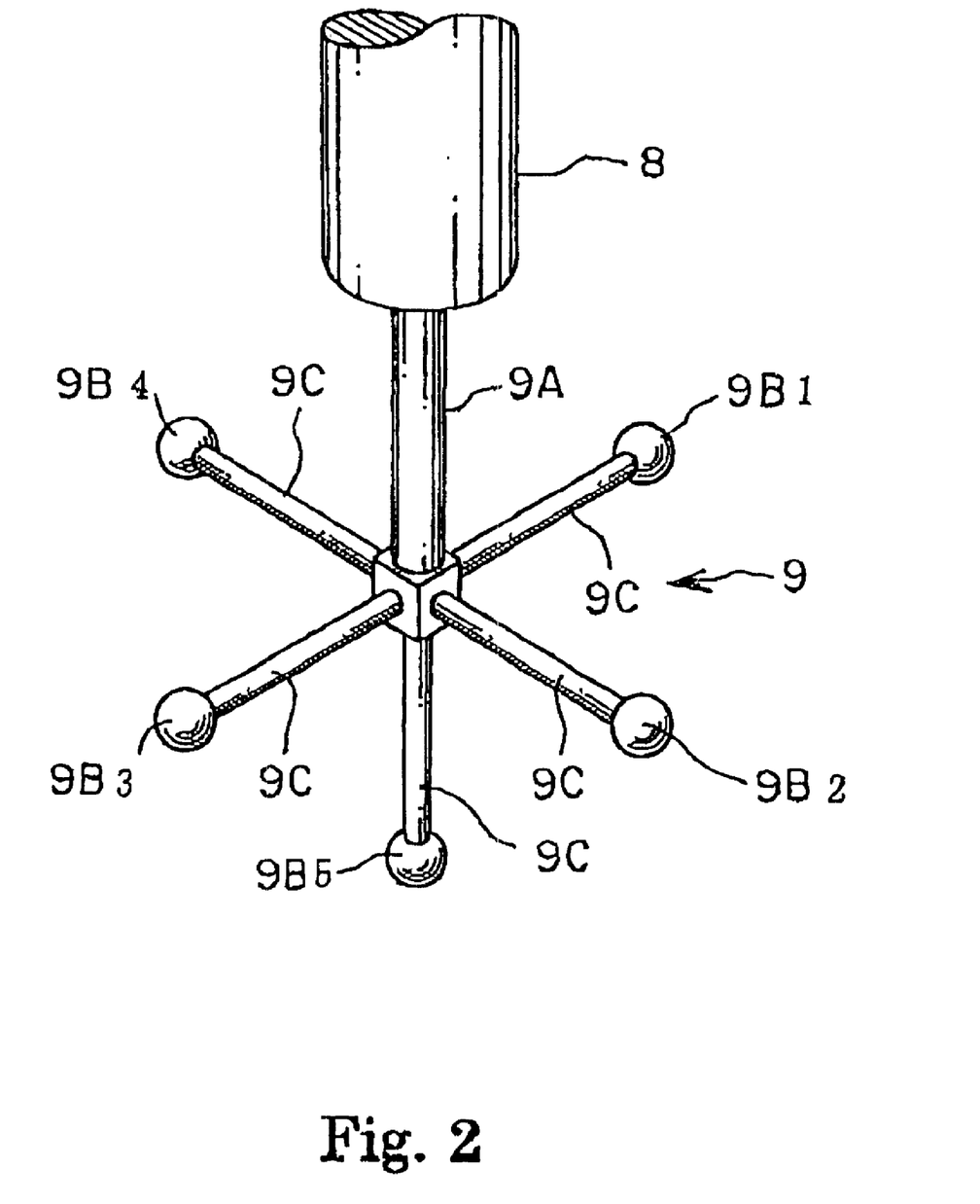
FIG. 2 is an enlarged view of a probe for a coordinate measuring machine, according to the present invention.

The probe 9 includes a holding shaft 9A attached to the lower end of the elevating/descending shaft 8, as shown in FIG. 2. The holding shaft 9A is provided with five branch shafts 9C secured thereto, each having a measuring ball 9B.

Four of the branch shafts 9C extend radially in four directions angularly offset from one another by 90 degrees so that two of shafts 9C extend parallel to axis X and the other two of shafts 9C extend parallel to axis Y in the horizontal plane, while the fifth branch shaft 9C extends in the vertical direction, i.e., in the Z axis direction. The measuring balls 9B are each made of a hard and abrasion-resistant material, such as artificial ruby or a ceramic, etc., and have highly precisely finished spherical surfaces of a predetermined diameter.

In a normal measuring operation, any measuring ball 9B at the front end of the associated branch shaft 9C of the probe 9 is brought into contact with a finished surface of a workpiece, which is an object to be measured, such as an engine block, placed on the measuring table 3 of the coordinate measuring machine 2. The displacement of the probe 9 in which a measuring ball 9B is moved from the reference position of the machine coordinate system to a contact position in which the ball is in contact with the finished surface of the workpiece is measured to check whether or not the finished workpiece has a predetermined dimension. Note that the measuring ball 9B that is to be brought into contact with the finished surface of the workpiece is selected in accordance with the position or direction of the finished surface to be measured.

To examine the accuracy of the coordinate measuring machine 2 per se and to calibrate the same, the gauge 1 for a coordinate measuring machine as shown in FIG. 1 is used in place of the workpiece to thereby estimate the measurement errors thereof.

The gauge 1 for a coordinate measuring machine in the illustrated embodiment is provided with a holder 10 which is made of a block of a uniform thickness in the form of an isosceles trapezoid in a plan view, and a plurality of balls (spheres) 11 which are arranged and spaced equidistantly from one another along each of the opposite nonparallel, or oblique, edge surfaces of the trapezoidal block 10, as shown in FIGS. 1, 3, 5, 7 and 10.

The holder 10 may be made of a granite in the illustrated embodiment because this material has a low thermal expansion coefficient and is less influenced by changes in temperature. Each surface of the holder 10 is finished to exhibit a highly precisely lapped surface. The holder 10 is provided with four through holes 10A extending in the thickness direction, i.e, between the major surfaces, thereof.

The through holes 10A contribute to a reduction in the weight and to easy handling of the holder. The through holes 10A are partly adapted to mount the holder 10 to the mounting jig (tool) 5, together with the side surface 10B that corresponds to a lower bottom surface of the trapezoidal holder, as will be discussed hereinafter.

The balls 11 are each made of a highly precisely finished ceramic and have a predetermined diameter and a highly spherical surface. Five balls 11 are arranged on each oblique side surface of the holder 10 along a line so that the centers of the balls 11 are spaced apart equidistantly.

Figure 6:
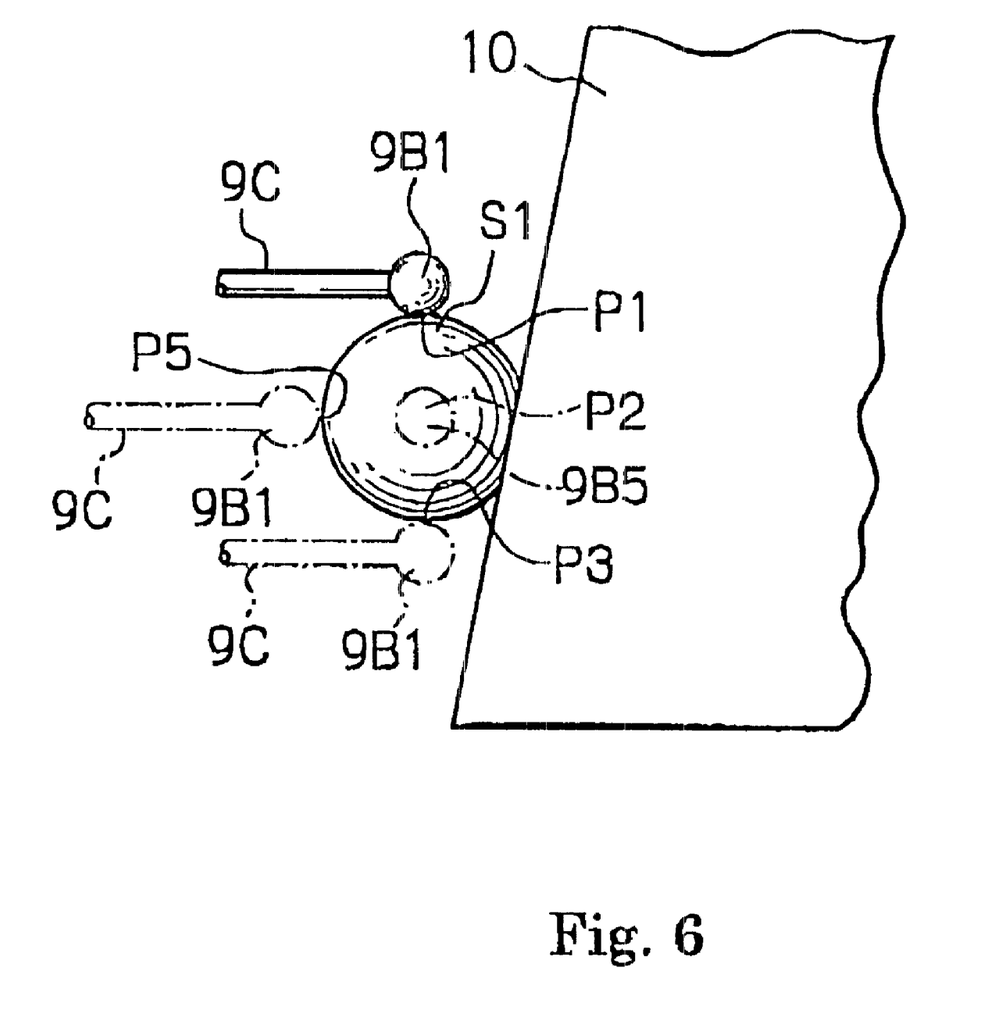
FIG. 6 is an explanatory view of a method for measuring a center of a spherical body, according to the present invention.

Note that, as indicated particularly by FIG. 6, the holder 10 is provided on each oblique surface thereof, with conical recesses corresponding to the balls 11, and the balls 11 are preferably adhered to the peripheral edges of the corresponding recesses by means of an adhesive.

Figure 3:
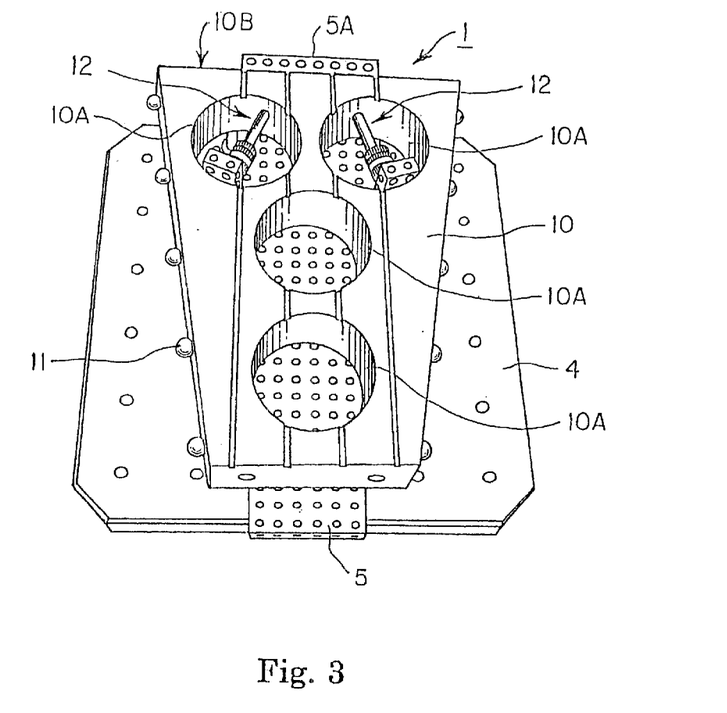
FIG. 3 is a perspective view of a gauge for a coordinate measuring machine, attached to a mounting fixture, according to the present invention.

FIG. 3 shows a gauge 1 for a coordinate measuring machine, attached to the jig pallet 4 via the mounting jig (tool) 5. The gauge 1 is firmly connected to the mounting jig 5, so that the side surface 10B of the holder 10 that corresponds to the bottom surface of the trapezoidal block abuts against an upright abutment plate 5A provided at one end of the mounting jig 5, and the inner surfaces of a pair of through holes 10A that are adjacent to the side surface 10B are pressed by respective clamps 12 to thereby press the side surface 10B against the abutment plate 5A.

Figure 4:
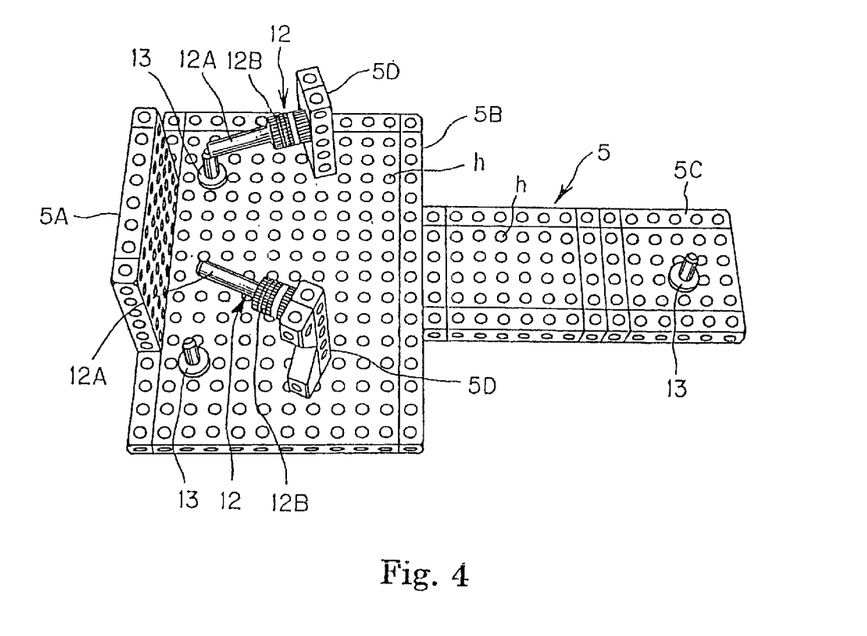
FIG. 4 is a perspective view of a mounting fixture to which a gauge for a coordinate measuring machine can be attached, according to the present invention.

As can be seen in FIG. 4, the mounting jig 5 is composed of a base plate 5B, the abutment plate 5A is secured to base plate 5B at one end thereof, and an extension plate 5C is secured to base plate 5B and extends from the base plate 5B in a direction opposite to the end which carries the abutment plate 5A.

The base plate 5B is provided thereon with a pair of clamp mounting upright blocks 5D to which the pair of clamps 12 are mounted.

Each clamp 12 is provided with a clamp rod 12A which extends toward the abutment plate 5A and which is movable in its axial direction. The axial movement (extension and retraction) of the clamp rods 12A occurs when respective operation rings 12B provided at the base ends of the clamp rods are manually rotated through associated screw mechanisms (not shown).

Two support pins 13 are provided on the base plate 5B, near the abutment plate 5C, and one support pin 13 is provided on the extension plate 5C. The support pins 13 abut against the holder 10 of the gauge 1 for a coordinate measuring machine to hold the same. Pins 13 contact the bottom major surface of holder 10 to create a space between holder 10 and base plate 5B.

In the illustrated embodiment, a large number of mounting holes h is formed in the base plate 5B and the extension plate 5C and the abutment plate 5A, and the clamp mounting blocks 5D and support pins 13 are secured to the plates 5B and 5c via selected ones of holes h so that the positions thereof can be selectively determined in accordance with the pitch of the mounting holes h. It should be appreciated that the mounting holes h are used also as bolt insertion holes for holding bolts (not shown) to secure the mounting jig 5 to the jig pallet 4.

The processes to evaluate measurement errors of the coordinate measuring machine 2 using the gauge 1 will be described below.

Figure 5:
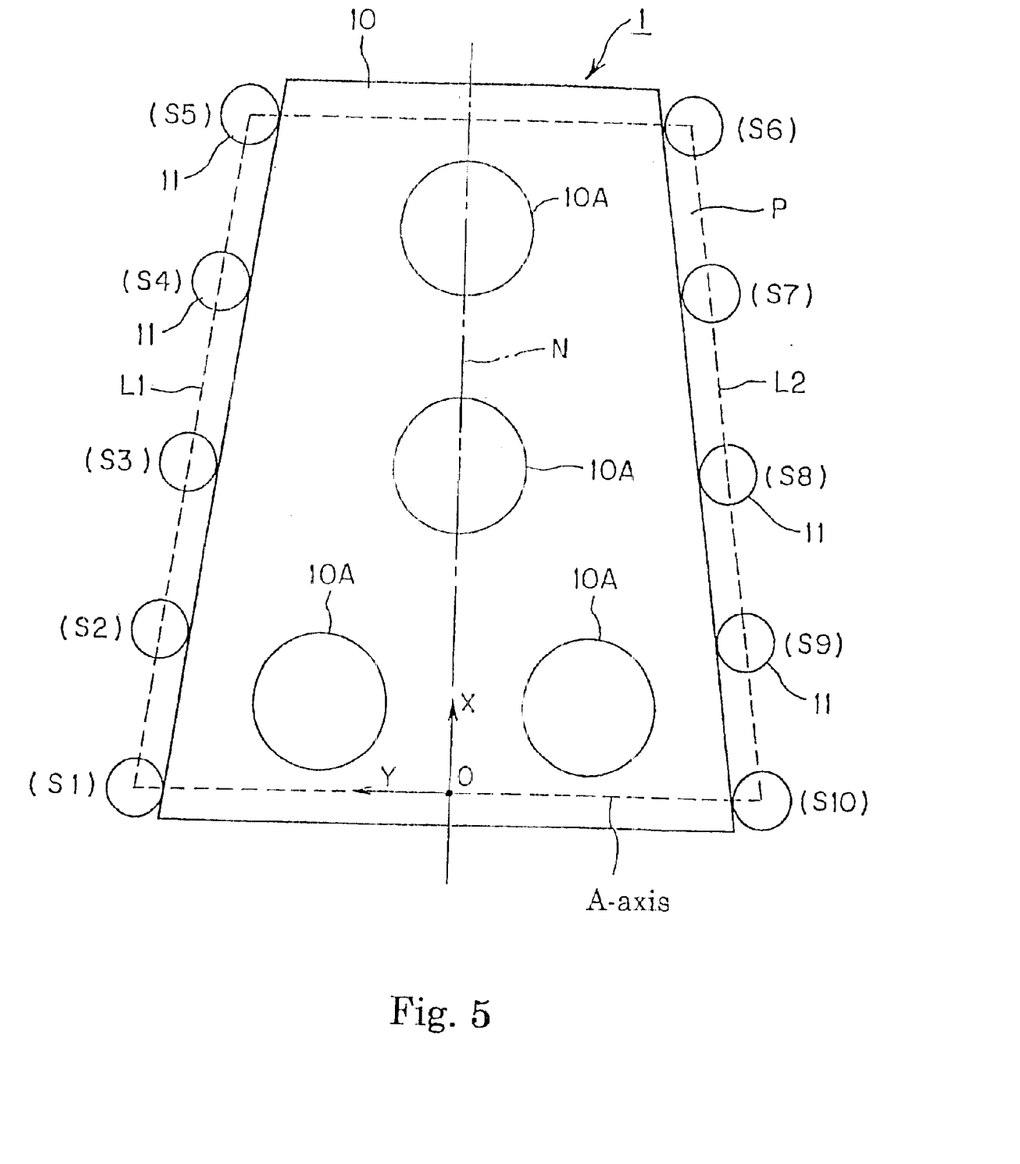
FIG. 5 is a plan view of a gauge for a coordinate measuring machine, according to the present invention.

FIG. 5 shows a plan view of the gauge 1 when it is set on the coordinate measuring machine 2 as shown in FIG. 1. The gauge 1 for a coordinate measuring machine is set so that the longitudinal center axis of the holder 10 coincides precisely with a reference axis N that extends substantially in parallel with the machine axis X.

As can be seen in FIG. 5, in the gauge 1 for a coordinate measuring machine of the illustrated embodiment, a totals of ten balls 11 are arranged symmetrically with respect to the reference axis N, along opposite non-parallel sides of the holder 10, so that the centers of the balls on one side are spaced apart equidistantly and are aligned on a straight line L1 and those on the other side are spaced apart equidistantly and are aligned on a straight line L2.

For clarity, it is assumed that the balls 11 along the line L1 are balls S1 through S5 and those along the line L2 are balls S6 through S10, respectively. The measuring operation begins with the measurement of the coordinates of the position of the center of the ball S1 by the coordinate measuring machine 2. In this operation, the measuring balls 9B1–9B5 provided on the probe 9 are successively brought into contact with the ball S1 at five points including four points on the equator of the ball S1, these being points P1, P2, P3 and a point, not shown, that is diametrically opposite P2, and one point P5 on one pole thereof For example, the contact points P1, P5, P3 and the contact point diametrically opposite P2 are contacted, one at a time in succession, with the measuring ball 9B1, and then the contact point P2 is contacted with the measuring ball 9B5, as shown in FIG. 6. The center position of the ball S1 can then be geometrically determined based on the positions of the contact points. Note that in FIG. 6, all five balls 9B are shown in contact with the ball S1. But, in actuality, only one ball 9B contacts ball S1 at a time.

Note that the "equator" refers to a great circle of the ball S1 which includes the diameter of the ball S1 and which lies in a vertical plane, which is a plane perpendicular to the planer of FIG. 5, parallel with the reference axis N, and the "pole" refers to a point on the ball S1 that is remote from the associated side surface of holder 10 and whose distance from the vertical plane is maximum, respectively.

Likewise, the center positions of the ball S5 on the line L1 and the balls S6 and S10 on the line L2 are measured. Consequently, a virtual reference plane P including the centers of the four balls S1, S5, S6 and S10 can be determined.

Thereafter, the coordinates associated with the gauge 1 for a coordinate measuring machine, i.e., the gauge coordinates are set, in which the origin O is defined by an intersection point between an axis "A" and the reference axis N, wherein the axis "A" represents a straight line connecting the centers of the balls S1 and S10. The intersection point lies at the midpoint of the axis "A".

The gauge coordinate system corresponds to an orthogonal coordinate system having two orthogonal axes X and Y, identical to the reference axis N and the axis "A", respectively, in the virtual reference plane. The gauge coordinate system corresponds to the machine coordinate system set in the machine axis direction of the coordinate measuring machine 2, one by one. Therefore, the coordinates of the center of each ball are found in the gauge coordinate system.

After the coordinates at the set position of the coordinate measuring machine are set, the center positions of the balls S1 to S10 are successively measured in that order and thereafter, the center positions of the balls S10 to S1 are successively measured in the opposite order, i.e., in the order from S10 to S1. Namely, the four measurements are carried out in the order of S1→S10, S10→S1, S1→S10 and S10→S1. In other words, the center position of each ball is measured twice on going from S1 to S10 and twice on return from S10 to S1, i.e., four times in total.

After that, the gauge 1 for a coordinate measuring machine is turned (inverted) by 180 degrees about the reference axis N and is set again on the mounting jig 5. The virtual reference plane and the axis "A" are determined by the same process as described above and new gauge coordinates are set on the gauge 1 for a coordinate measuring machine.

Thereafter, the center positions of the balls S1 through S10 are successively measured four times in total, for the inverted position of the gauge 1, in the same way as that for the original position of the gauge 1. After that, the measuring operation consisting of four measurements on going and four measurements on return is again performed for each side of the gauge 1 to confirm the reproduction of the measurements. Namely, each ball is measured eight times in total for the two positions of the gauge 1.

In an evaluation of the measurement error of the coordinate measuring machine 2, a measurement error in connection with a stable measurement of the balls is first carried out, using the measurements of the diameters of the balls S1 to S10 obtained by the measuring operations and the pure values of the ball diameters of the balls S1 to S10.

Figure 7:
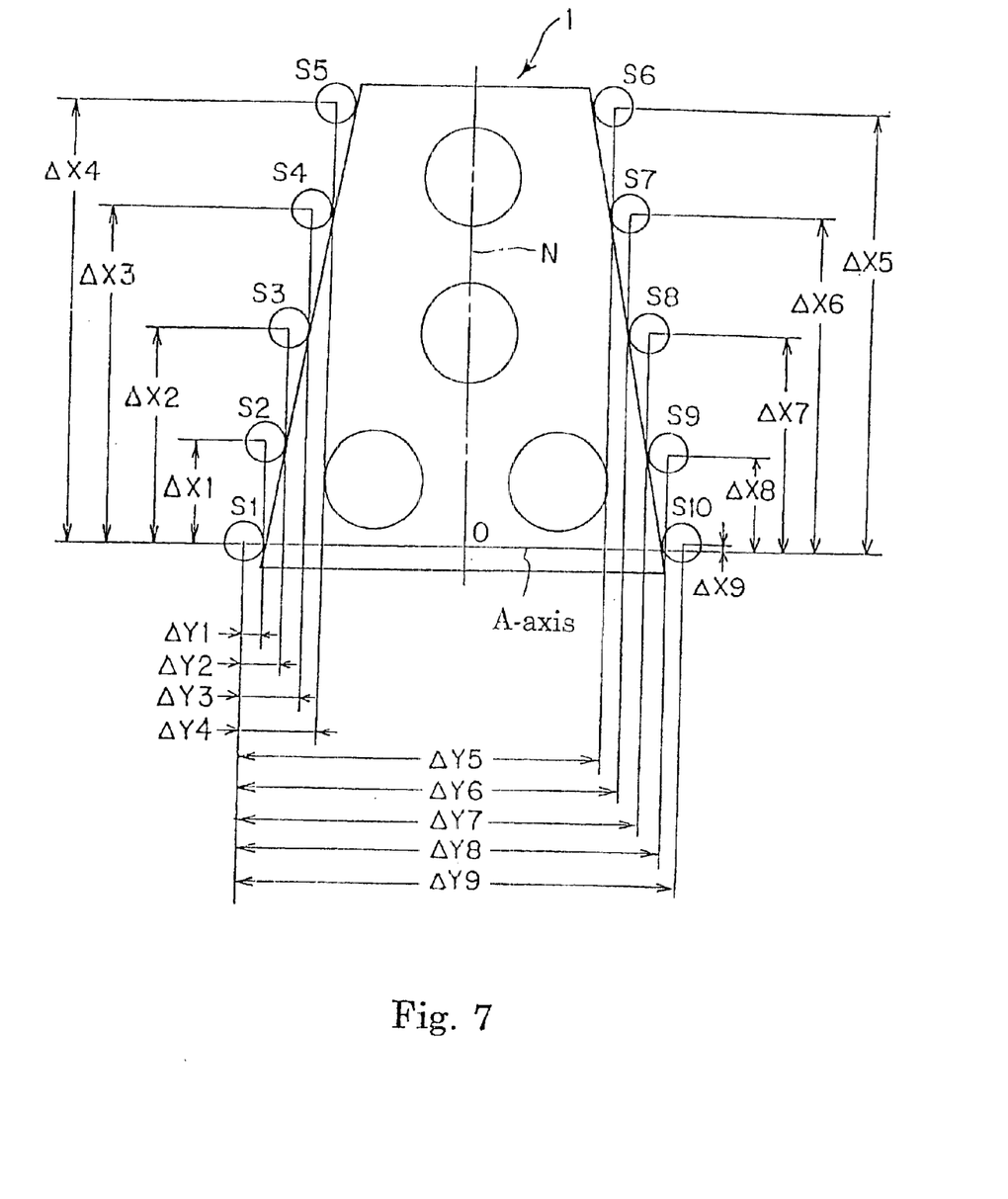
FIG. 7 is an explanatory view of a method for measuring a distance between centers of spherical bodies, according to the present invention.

Thereafter, as shown in FIG. 7, the inter-center distances $\Delta Xk-1$ and $\Delta Yk-1$ between the center of the ball S1 and the center of each ball Sk in the X-axis direction (i.e., the direction of the reference axis N) and in the Y-axis direction (the direction of the axis "A"), respectively, are calculated based on the measurements for the gauge 1 which is set with the front side facing upward, and are compared with pure values of the inter-center distances to evaluate errors, wherein the term "k" represents the number, from 2 to 10, assigned to the ball whose center distance from the center of ball S1 is being calculated. As used herein, pure values are values that were previously determined and that are known to be accurate.

Thereafter, likewise, the inter-center distances $\Delta Xk'-1$ and $\Delta Yk'-1$ between the center of the ball S1 and the center of each ball Sk in the A-axis direction and in the N-axis direction, respectively, are calculated based on the measurements for the gauge 1 which has been turned by 180 degrees, with the rear side facing upward, and are compared with pure values of the inter-center distances to evaluate errors.

Here, mean values of the measurements obtained when the gauge 1 is set with the front side facing upward and when the gauge 1 is inverted with the rear side facing upward are used to evaluate the errors to thereby enhance the accuracy of the measurement.

In the gauge 1 for a coordinate measuring machine in the illustrated embodiment, it is possible to vary the inter-center distances $\Delta Xk'-1$ and $\Delta Yk'-1$ between the ball S1 and the ball Sk in the A-axis direction and in the N-axis direction, respectively, from a small value to a large value by changing the inclination angle of the oblique surfaces of the holder 10 in the form of a trapezoidal block with respect to the reference axis N in order to carry out a scale-calibration of the coordinate measuring machine 2.

After that, the evaluation of the straightness of the machine axes of the coordinate measuring machine 2 is effected. First, $\delta i=(Yi-Y'i)/2$ is calculated from the coordinates Yi of the ball Si when the gauge 1 for a coordinate measuring machine is set with the front side facing upward and the coordinates Y'i of the ball Si when the gauge is inverted with the rear side facing upward, wherein Si represents the i-th ball. The indices "i" and "k" are both free indices for the balls.

Figure 8:
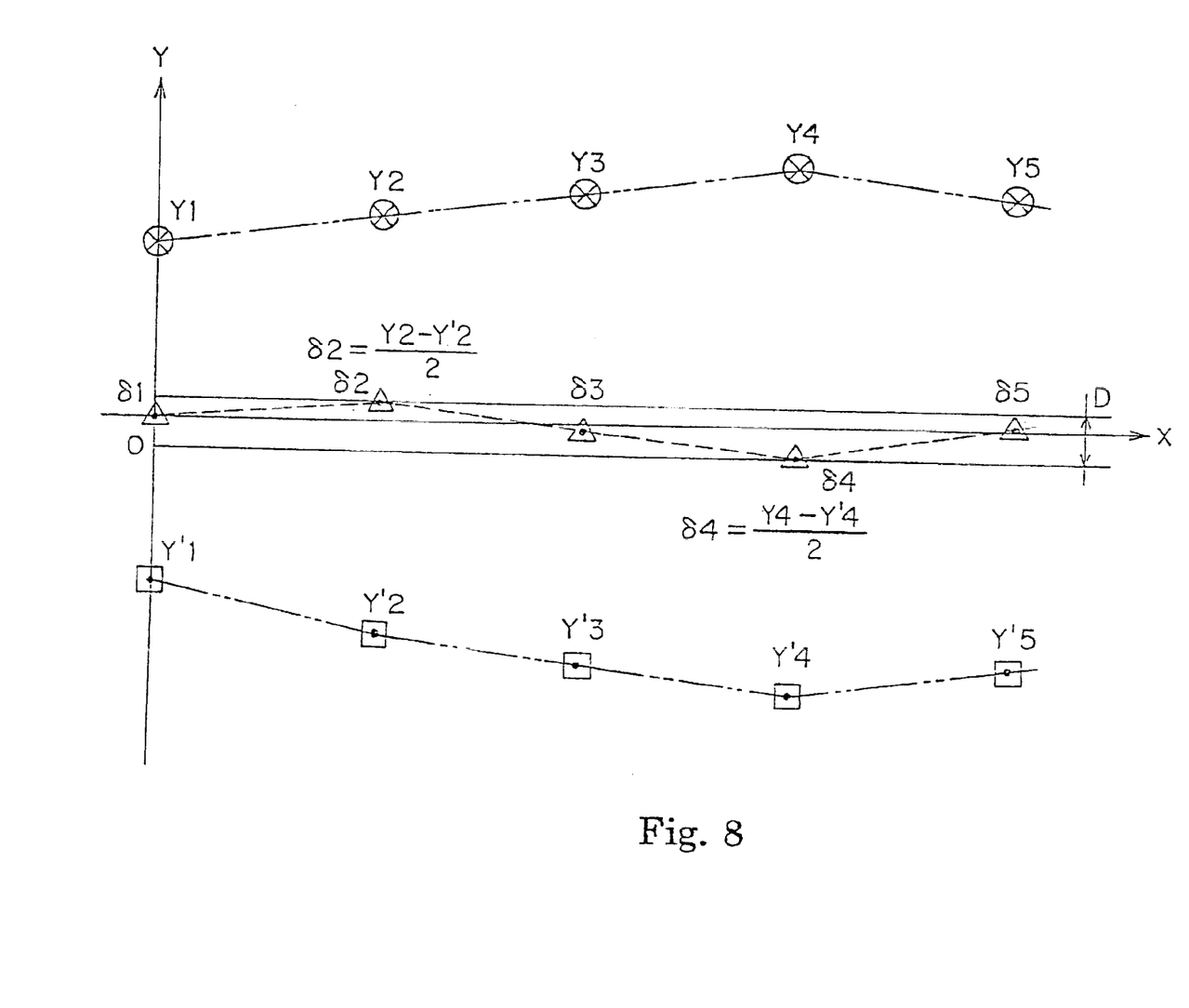
FIG. 8 is an explanatory view of a method for determining the straightness in an X axis direction.

FIG. 8 shows calculation results of $\delta 1$ to $\delta 5$ plotted in the graph for the five balls S1 to S5 provided on one side of the gauge 1 for a coordinate measuring machine. The straightness of the machine axis in the X-axis direction is evaluated based on the difference D between the maximum and minimum values of $5i$. In FIG. 8, the maximum value is given by $\delta 2=(Y2-Y'2)/2$ and the minimum value is given by $\delta 4=(Y4-Y'4)/2$, respectively.

Similar calculations are carried out for the balls S6 to S10 to obtain the difference D between the maximum and minimum values of δi (i=6–10). The mean value of the differences D is used to evaluate the straightness to enhance the accuracy of the measurement.

Thereafter, the evaluation of the orthogonality between the two axes of the coordinate measuring machine 2 is carried out. First, referring to FIG. 9, the angle θ between the axis X of the coordinates and the regression line R of the centers of the five balls S1 to S5 is obtained by the least squares method based on the coordinates of the centers of the balls S1 to S5 when the gauge 1 is set with the front side facing upward.

Figure 9:
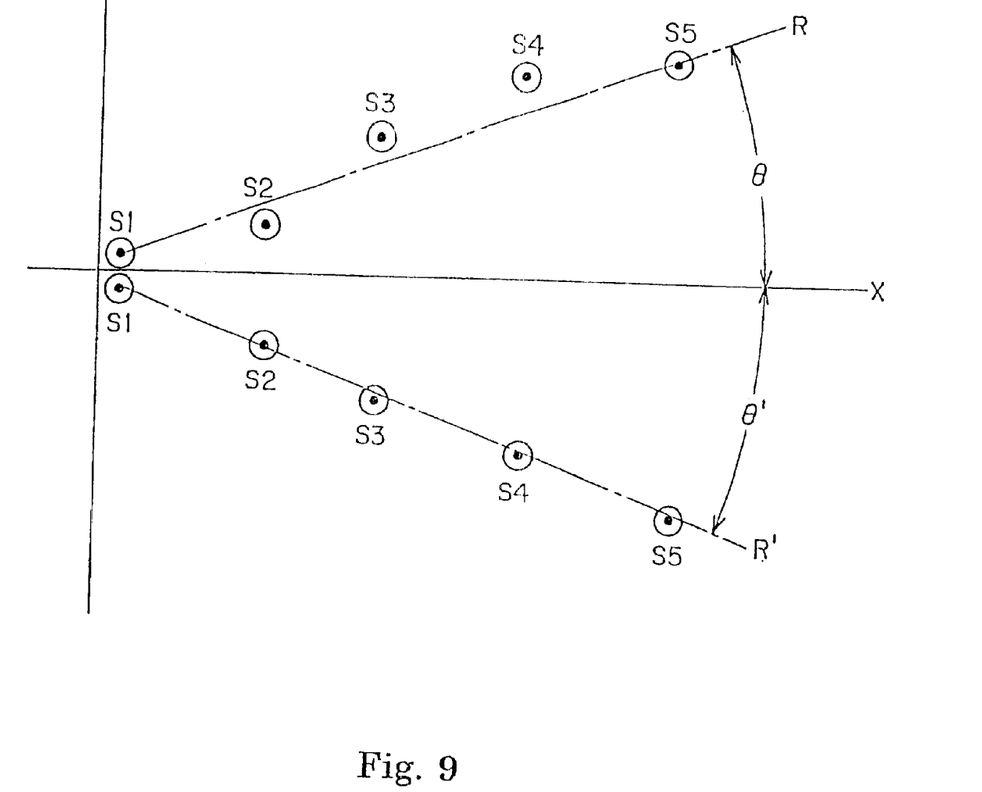
FIG. 9 is an explanatory view of a method for measuring the orthogonality of axes, according to the present invention.

Thereafter, the angle θ' between the axis X of the coordinates and the regression line R' of the centers of the five balls S1 to S5 is obtained by the least squares method based on the coordinates of the centers of the balls S1 to S5 when the gauge 1 is turned and inverted by 180 degrees.

The orthogonality of the machine axes of the coordinate measuring machine 2 is estimated by calculating (θ−θ')/2.

Moreover, the orthogonality of the remaining five balls S6 to S10 is evaluated in the same way as that for the balls S1 to S5. The orthogonality of the axes X and Y of the coordinate measuring machine 2 is eventually evaluated using the mean value of the two orthogonality evaluation results.

Figure 10A:
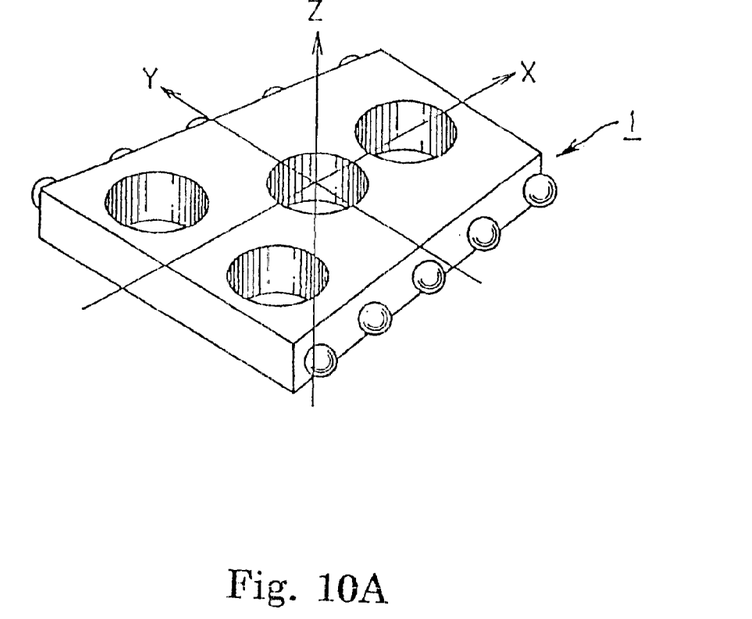
FIGS. 10A and 10B are schematic views of a gauge for a coordinate measuring machine, in a horizontal position, in connection with a coordinate measuring machine, according to the present invention.
Figure 10B:
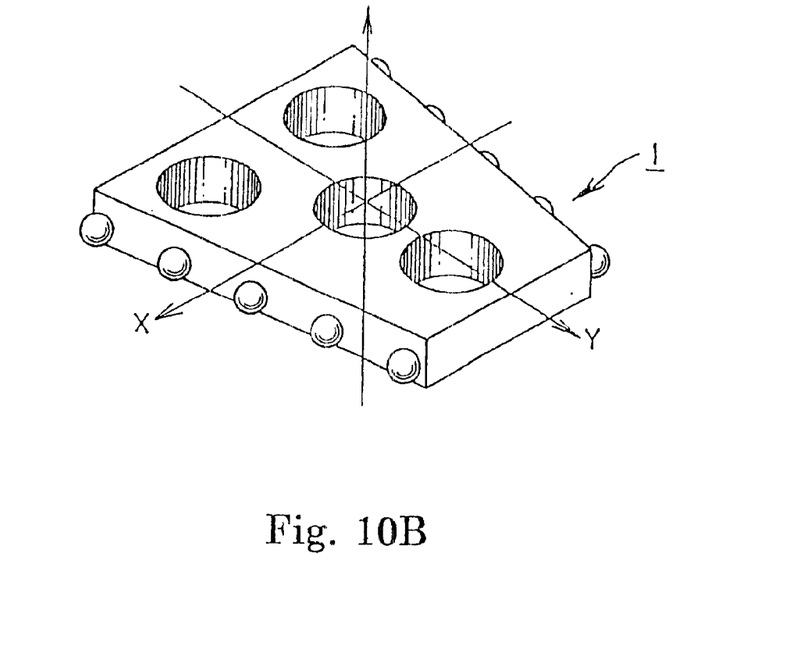

The above discussion has been directed to the gauge 1 which is oriented as shown in FIG. 10A and is set on the coordinate measuring machine 2. Alternatively, t is possible to set the gauge 1 in the direction as shown in FIG. 10B, in which the direction of the gauge 1 is rotated by 90 degrees in the X-Y plane with respect to the direction of the gauge 1 in FIG. 10A. The arrangement shown in FIG. 10B is for the evaluation of the straightness of the machine axis in the Y-axis direction.

Figure 10C:
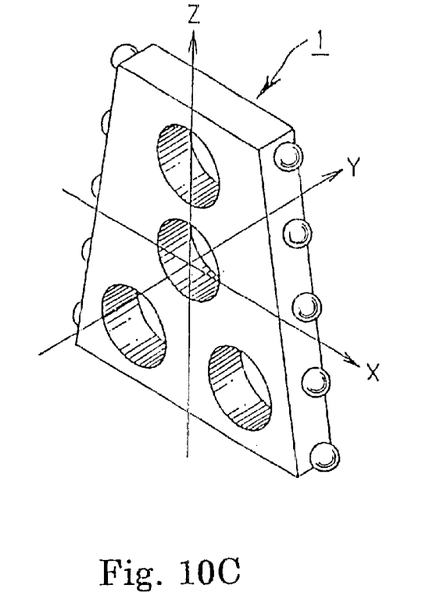
FIGS. 10C and 10D are schematic views of a gauge for a coordinate measuring machine, in an upright position, in connection with a coordinate measuring machine, according to the present invention.

Furthermore, it is possible to set the gauge 1 in an upright position as shown in FIG. 10C, to evaluate the deflection of the machine axis Z in the direction of the axis X and the orthogonality of the two axes Z and X.

Figure 10D:
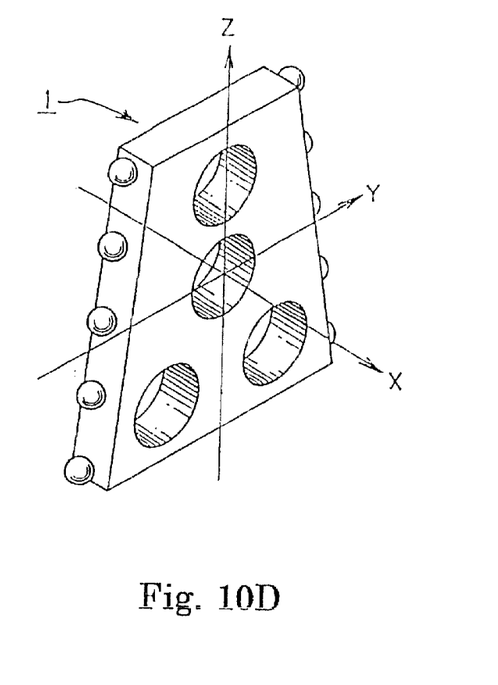

Alternatively, it is possible to set the gauge 1 in an upright position as shown in FIG. 10D in which the upright gauge is rotated by 90 degrees about the axis Z with respect the arrangement shown in FIG. 10C, to evaluate the deflection of the machine axis Z in the direction of the axis Y and the orthogonality of the two axes Y and Z.

Figure 11:
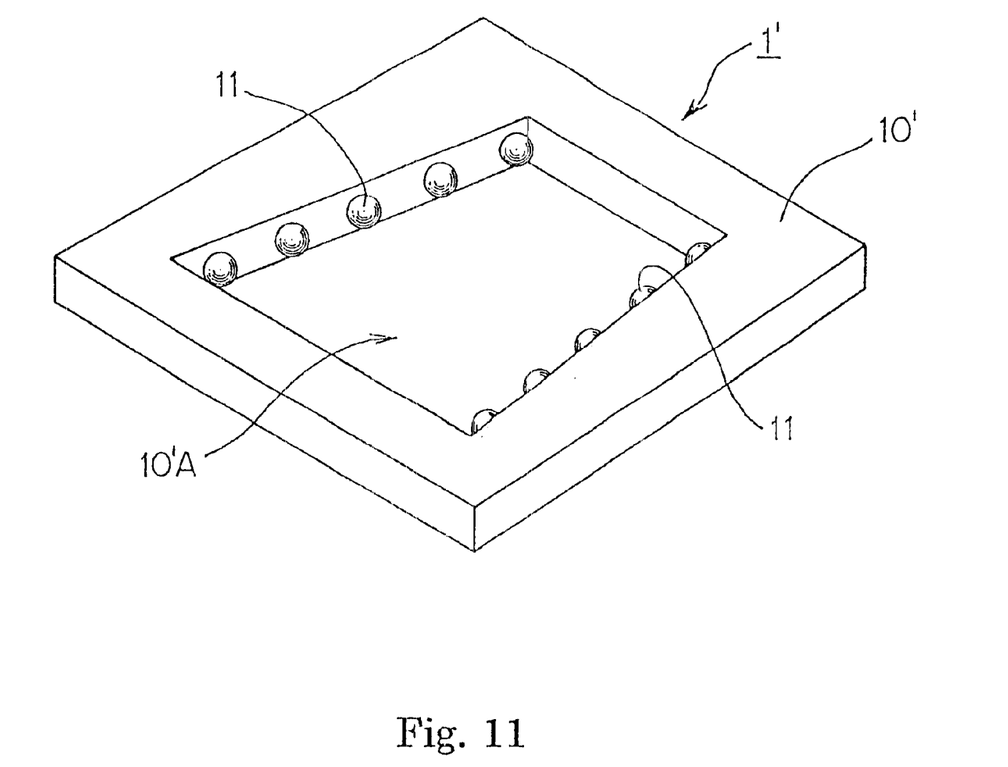
FIG. 11 is a perspective view of another embodiment of a gauge for a coordinate measuring machine, according to the present invention.

FIG. 11 shows a perspective view of another embodiment of a gauge for a coordinate measuring machine according to the present invention. In FIG. 11, the gauge 1' has a holder 10' in the form of a parallelepiped and flat block having an isosceles trapezoidal through hole 10'A. The balls 11, identical to those in the previous embodiment, are provided on the opposed oblique surfaces of the trapezoidal through hole 10'A and are arranged along the lines parallel with the oblique surfaces.

The centers of the balls 11 are aligned on and along lines extending in parallel with the opposed oblique surfaces of the through hole 10'A and all lie in one virtual reference plane. In the illustrated embodiment, five balls 11 are provided on each of the oblique surfaces and are spaced apart equidistantly.

In the gauge 1' for a coordinate measuring machine in this embodiment, the direction normal to the virtual reference plane including the lines on which balls 11 are aligned is identical to the direction of the thickness of the block of which the holder 10' is made, and the reference axis is perpendicular to the parallel upper and lower sides of holder 10', and the upper and lower surfaces of the trapezoidal through hole 10'A.

Note that the gauge 1' for a coordinate measuring machine can be set on the coordinate measuring machine 2 shown in FIG. 1, similarly to the gauge 1 in the previous embodiment, by varying the positions of the clamps 12, and if necessary of the pins 13, of the mounting jig 5 shown in FIG. 4.

As can be understood from the above discussion, according to the invention, coordinate data to evaluate the measurement accuracy of the distance between two points in a coordinate measuring machine and the straightness of the machine axes thereof, as well as the orthogonality between the machine axes, can be obtained at one time. Thus, the measurement errors of the measuring device can be effectively evaluated.

In further accordance with the invention, inherent errors of the gauge for a coordinate measuring machine can be removed from the measurements obtained when the gauge is set with the front side facing upward and when the gauge is inverted with the rear side facing upward, so that the straightness of the machine axes of the coordinate measuring machine can be precisely evaluated.

Further according to the invention, inherent errors of the gauge for a coordinate measuring machine can be removed from the measurements obtained when the gauge is set with the front side facing upward and when the gauge is inverted with the rear side facing upward, so that the orthogonality of the machine axes of the coordinate measuring machine can be precisely evaluated.

Further according to the invention, data to evaluate the measurement accuracy of the distance between two points in a coordinate measuring machine or the straightness of the machine axes thereof, as well as the orthogonality between the machine axes, can be easily and precisely obtained. Consequently, an inexpensive gauge for a coordinate measuring machine can be provided.

Since, according to a particular feature of the invention, the balls are arranged on opposite oblique surfaces of a trapezoidal block which constitutes the holder, the number of measuring points can be increased, and hence the error estimate of the coordinate measuring machine can be more precisely carried out.

When, according to one embodiment of the invention, the balls are arranged in the trapezoidal through hole formed in the holder, not only can the balls be protected, but also the weight of the holder can be reduced.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method for evaluating measurement errors in a coordinate measuring machine, in which a tip of a probe is moved relative to an object to be measured, along three mutually orthogonal machine axes, comprising;

a first step of placing, on a measuring table of the coordinate measuring machine, a gauge for the machine, the gauge having a reference axis and being provided with a plurality of balls whose centers are aligned on at least one straight line that is spaced from the reference axis of the gauge and that is inclined with respect to the reference axis of the gauge, wherein the centers of the plurality of balls are aligned on at least two straight lines that form an angle different from 90° with one another and wherein the centers of the plurality of balls are located on and along an oblique line which extends in an oblique direction with respect to the reference axis, the reference axis lying in virtual reference plane and extending along the virtual reference plane, the gauge being positioned so that that the reference axis is in parallel with one of the three machine axes of the coordinate measuring machine and so that the virtual reference plane is in parallel with either one of the remaining two machine axes of the coordinate measuring machine;

a second step of measuring, with the machine, the coordinates of the center of each ball relative to the two machine axes;

a third step of rotating the gauge about the reference axis by 180 degrees and again placing the gauge on the measuring table of the coordinate measuring machine; and, a fourth step of again measuring, with the machine, the coordinates of the center of each ball relative to the two machine axes.

2. The method of claim 1, wherein the one of the two machine axes is an X machine axis and the other one of the two machine axes is a Y machine axis, and further comprising evaluating the straightness of the X machine axis is evaluated, based on Y machine axis coordinates of the centers of the balls in a direction perpendicular to the reference axis of the gauge obtained in the second step, and Y machine axis coordinates of the centers of the balls obtained in the fourth step, said step of evaluating comprising:

in a first calculating step, calculating, for each ball, the difference between Y machine coordinates obtained in the second and fourth steps;

determining the maximum and minimum values of the differences obtained for all balls in the first calculating step; and in a second calculating step, calculating the difference between the maximum and minimum values determined in said determining step.

3. The method of claim 1, further comprising:

calculating a first regression line from the coordinates of the centers of the balls relative to the two machine axes obtained in the second step to thereby calculate an angle $\theta$ between the first regression line and the reference axis;

calculating a second regression line from the coordinates of the centers of the balls relative to the two machine axes obtained in the fourth step to thereby calculate an angle $\theta'$ between the second regression line and the reference axis;

and calculating $(\theta-\theta')/2$ to evaluate the mutual orthogonality of the two machine axes parallel with the virtual reference plane.

4. A gauge for a coordinate measuring machine for performing measurement along at least two machine axes, the machine having a probe provided with a tip, said gauge having a reference axis and comprising:

a plurality of balls arranged to be contacted by the tip of the probe; and a holder holding the balls so that the centers of the balls extend along at least one straight line that is spaced from the reference axis and that is inclined with respect to the reference axis, wherein the centers of the plurality of balls are aligned on at least two straight lines that form an angle different from 90° with one another and wherein the centers of the plurality of balls are located on and along an oblique line which extends in an oblique direction with respect to the reference axis, the reference axis lying in a virtual reference plane and extending along the virtual reference plane, said holder being capable of attachment to the coordinate measuring machine so that the virtual reference plane is parallel with the two machine axes so that the reference axis is parallel to one of the two machine axes.

5. The gauge of claim 4, wherein: the at least one line comprises two lines; said holder is made of a trapezoidal block having two non-parallel sides, each side being parallel to a respective one of the two lines; and the balls are arrayed and mounted along the two lines.

6. The gauge of claim 4, wherein: the at least one line comprises two lines; said holder is made of a block having a trapezoidal through hole with two non-parallel sides, each side being parallel to a respective one of the two lines; and the balls are arrayed and mounted along the two lines.

* * * * *